(12) United States Patent
Domnich et al.

(10) Patent No.: US 11,641,386 B2
(45) Date of Patent: *May 2, 2023

(54) METHOD AND APPARATUS FOR DELIVERING MULTIMEDIA COMMUNICATION DATA TO A THIN CLIENT DEVICE

(71) Applicant: JPMorgan Chase Bank, N.A., New York, NY (US)

(72) Inventors: Mikhail Domnich, South Amboy, NJ (US); Adeel A. Khan, Monmouth Junction, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/527,337

(22) Filed: Nov. 16, 2021

(65) Prior Publication Data

US 2022/0078223 A1   Mar. 10, 2022

Related U.S. Application Data

(63) Continuation of application No. 17/109,577, filed on Dec. 2, 2020, now Pat. No. 11,201,902, which is a
(Continued)

(51) Int. Cl.
*H04L 29/06* (2006.01)
*H04L 29/08* (2006.01)
(Continued)

(52) U.S. Cl.
CPC .............. *H04L 65/65* (2022.05); *H04L 67/01* (2022.05); *H04L 67/565* (2022.05); *H04M 1/2535* (2013.01)

(58) Field of Classification Search
CPC .............. H04L 65/1059; H04L 65/608; H04L 67/2823; H04L 67/42; H04M 1/2535
(Continued)

(56) References Cited

U.S. PATENT DOCUMENTS 8,135,126 B2   3/2012   Shafiee et al.
8,713,193 B1 *  4/2014   Breau ................. H04L 65/4092
                                                     709/231

(Continued)

FOREIGN PATENT DOCUMENTS

KR         20140094212          7/2014

*Primary Examiner* — Zi Ye
*Assistant Examiner* — Berhanu Shitayewoldetadik
(74) *Attorney, Agent, or Firm* — Greenblum & Bernstein, P.L.C.

(57) ABSTRACT

Various methods, apparatuses/systems, and media for delivering a multimedia communication to a thin client device are provided. A processor receives multimedia communication data from a telephony device over a network and transfers the multimedia communication data to a switching device. The processor also establishes a connection between a browser, embedded within the thin client device, and a server. The processor delivers and terminates the multimedia communication data to the thin client device using the browser embedded within the thin client device after establishing the connection between the browser and the server.

20 Claims, 6 Drawing Sheets

Related U.S. Application Data continuation of application No. 16/363,572, filed on Mar. 25, 2019, now Pat. No. 10,887,367.

(60) Provisional application No. 62/647,916, filed on Mar. 26, 2018.

(51) Int. Cl.
  *H04M 1/253* (2006.01)
  *H04L 12/26* (2006.01)
  *H04L 65/65* (2022.01)
  *H04L 67/01* (2022.01)
  *H04L 67/565* (2022.01)

(58) Field of Classification Search
  USPC .......................................................... 709/231
  See application file for complete search history.

(56) References Cited

U.S. PATENT DOCUMENTS

| | | |
|---|---|---|
| 2002/0089998 A1 | 7/2002 | Le |
| 2005/0002514 A1* | 1/2005 | Shafiee .............. H04M 7/0039 379/265.09 |
| 2009/0298484 A1* | 12/2009 | White .................... H04H 20/42 455/414.3 |
| 2010/0146574 A1* | 6/2010 | Kisel ...................... H04L 47/70 725/115 |
| 2010/0291927 A1* | 11/2010 | Wu ....................... H04W 48/20 455/435.3 |
| 2011/0225569 A1 | 9/2011 | Beaty et al. |
| 2012/0331406 A1 | 12/2012 | Baird et al. |
| 2013/0013727 A1 | 1/2013 | Walker |
| 2013/0163580 A1* | 6/2013 | Vass ...................... H04L 65/103 370/352 |
| 2013/0326081 A1 | 12/2013 | Katz et al. |
| 2014/0094212 A1* | 4/2014 | Ahn ........................ H04W 4/70 455/517 |
| 2014/0126715 A1* | 5/2014 | Lum .................... H04M 3/5191 379/265.09 |
| 2014/0133638 A1 | 5/2014 | Biswas et al. |
| 2014/0241512 A1* | 8/2014 | Michaelis .......... H04M 3/42391 379/52 |
| 2015/0142879 A1* | 5/2015 | Rameil-Green ........ H04L 41/28 709/203 |
| 2016/0149836 A1* | 5/2016 | Narayanan .......... H04L 65/1033 709/206 |
| 2016/0260157 A1* | 9/2016 | Krook ..................... H04L 67/16 |
| 2016/0286006 A1 | 9/2016 | Klaghofer et al. |
| 2016/0321470 A1* | 11/2016 | Singh ................... G06F 21/6263 |
| 2017/0325142 A1* | 11/2017 | Lam .................... H04L 65/1006 |
| 2017/0347279 A1* | 11/2017 | Bejerano ............... H04W 24/02 |
| 2017/0374581 A1* | 12/2017 | Dao ....................... H04W 76/40 |
| 2019/0296927 A1 | 9/2019 | Klein et al. |
| 2020/0275171 A1* | 8/2020 | Cloud ................. H04N 21/64784 |

* cited by examiner

METHOD AND APPARATUS FOR DELIVERING MULTIMEDIA COMMUNICATION DATA TO A THIN CLIENT DEVICE

CROSS-REFERENCE TO RELATED APPLICATIONS

This application is a continuation of U.S. patent application Ser. No. 17/109,577, filed Dec. 2, 2020, which is a continuation of U.S. patent application Ser. No. 16/363,572, filed Mar. 25, 2019, which issued as U.S. Pat. No. 10,887,367 on Jan. 5, 2021, which claims the benefit of U.S. Provisional Application No. 62/647,916, filed Mar. 26, 2018. The entire disclosure of each of the above-identified applications is incorporated herein by reference in its entirety.

TECHNICAL FIELD

This disclosure generally relates to multimedia communications, and, more particularly, to methods and apparatuses for implementing a thin client module for efficient delivery and termination of multimedia communication traffic on a browser running on a thin client device.

BACKGROUND

Currently, enterprise level multimedia communications may be handled by physical desk phones tied user-specific workstations. These desk phones are typically linked an employee profile, and handle all communication resources at the physical phone. This conventional solution may be proved to be expensive, in part because of the necessary hardware required for every active employee, as well as the added cost to support the required infrastructure. An additional drawback of using desk phones for multimedia communication traffic may be that users are typically required to be physically present at their workstation. This may introduce problems when the user is required work of multiple offices or needs the ability "free seat" multiple locations within the office. The ability to support "free seating" where an employee may access all the features of their workstation without being physically located at their desk is becoming more desirable in enterprise settings.

An alternative to the deployment of physical desk phones to handle multimedia communications may be the use of a "soft phone" at the user workstation. A soft phone is a software-based solution that emulates the features of a physical desk phone on a desktop or laptop workstation computer. However, many companies have shifted to the deployment of thin client workstation hardware that lacks the same processing power and functionality of a traditional desktop or laptop workstation. Instead of relying on the processing power of the physically located workstation, the thin client hardware is dependent upon networked resources accessed through a virtual or simulated desktop environment. A drawback to thin client solutions may be that soft phone solutions are limited when deployed on such thin client workstation hardware relying on Virtual Desktop Infrastructure (VDI) or similar virtual or simulated desktop environments.

Conventionally, deployment of soft phone elements in virtual desktop environments may require specialized, vendor-specific software to be installed directly on the thin client. This may complicate the deployment of soft phone architecture and may often negate the cost saving effects of using soft phones rather than traditional desk phones. Furthermore, while delivery of multimedia communications to a thin client utilizing a virtual desktop environment has been accomplished with specialized software, communication data that may be delivered to the thin client, but will continue to run on the data server, wasting computing resources.

In view of the foregoing, it would be desirable to provide a solution for the delivery and termination of multimedia communication traffic at thin client hardware which overcomes the above-described deficiencies and shortcomings.

SUMMARY

The present disclosure, through one or more of its various aspects, embodiments, and/or specific features or sub-components, provides, inter alia, various systems, servers, devices, methods, media, programs, and platforms for implementing a thin client module for efficient delivery and termination of multimedia communication traffic (or communication data) on a browser running on thin client hardware without the need for specially installed software. The various aspects, embodiments, features, and/or sub-components provide optimized processes of implementing a thin client module in which the delivery and termination of multimedia communication traffic may be accomplished by utilizing existing ubiquitous browser software already installed or readily installed on the thin client, thereby eliminating the need for specialized software to be installed at the thin client.

According to an aspect of the present disclosure, a method for delivering a multimedia communication data to a thin client device by utilizing one or more processors and one or more memories is disclosed. The method may comprise: receiving, by one or more processors, multimedia communication data from a telephony device over a network; transferring, by the one or more processors, the multimedia communication data to a switching device, establishing a connection, by the one or more processors, between a browser embedded within the thin client device and a server, wherein the thin client device is configured to access Web Real-Time Communication (Web RTC) applications within a Web RTC device through the browser after establishing the connection between the browser and the server; establishing, by the one or more processors, a connection between the Web RTC device and the switching device through a call control signal; and delivering and terminating, by the one or more processors, the multimedia communication data to the thin client device using the browser embedded within the thin client device based on the call control signal.

According to another aspect of the present disclosure, the call control signal may include a voice over internet protocol (VoIP) call control signal. For example, the call control signal may include a session initiation protocol (SIP) call control signal, a Web RTC protocol call control signal, or an H.323 protocol call control signal.

According to a further aspect of the present disclosure, the method may further comprise: delivering and terminating, by the one or more processors, the multimedia communication data directly to an audio card of the thin client device through the browser embedded within the thin client device.

According to yet another aspect of the present disclosure, the multimedia communication data may be a voice over internet protocol (VoIP) call.

According to an aspect of the present disclosure, the browser embedded within the thin client device may be a ubiquitous feature of a thin client device configuration as the thin client device requires access to networked applications and resources to achieve full functionality.

According to yet another aspect of the present disclosure, the method may further comprise: running, by the one or more processors, a first session of accessing the multimedia communication data from the server from a first browser window of the browser embedded within the thin client device after establishing the connection between the browser and the server.

According to another aspect of the present disclosure, the method may further comprise: establishing a connection, by the one or more processors, between the thin client device and the server via a second browser window embedded within a virtual desktop environment, the second browser window is separate from the first browser window in that the second browser window is not embedded within the browser of the thin client device; and running, by the one or more processors, a second session of controlling the multimedia communication data from the second browser window.

According to still another aspect of the present disclosure, the method may further comprise: simultaneously running, by the one or more processors, the first session and the second session.

According to another aspect of the present disclosure, a system for delivering a multimedia communication data to a thin client device is provided. The system may include: a processor; and a server having a memory. The processor may be configured to: receive multimedia communication data from a telephony device over a network; transfer the multimedia communication data to a switching device; establish a connection between a browser embedded within the thin client device and a server, wherein the thin client device is configured to access Web Real-Time Communication (Web RTC) applications within a Web RTC device through the browser after establishing the connection between the browser and the server; establish a connection between the Web RTC device and the switching device through a call control signal; and deliver and terminate the multimedia communication data to the thin client device using the browser embedded within the thin client device based on the call control signal.

According to yet another aspect of the present disclosure, the processor may be further configured to deliver and terminate the multimedia communication data directly to an audio card of the thin client device through the browser embedded within the thin client device.

According to still another aspect of the present disclosure, the processor may be further configured to run a first session of accessing the multimedia communication data from the server from a first browser window of the browser embedded within the thin client device after establishing the connection between the browser and the server.

According to another aspect of the present disclosure, the processor may be further configured to: establish a connection between the thin client device and the server via a second browser window embedded within a virtual desktop environment, the second browser window is separate from the first browser window in that the second browser window is not embedded within the browser of the thin client device; and run a second session of controlling the multimedia communication data from the second browser window.

According to yet another aspect of the present disclosure, the processor may be further configured to simultaneously run the first session and the second session.

According to a further aspect of the present disclosure, a non-transitory computer readable medium configured to store instructions for delivering a multimedia communication to a thin client device is provided. When executed, the instructions may cause a processor to perform the following: receiving multimedia communication data from a telephony device over a network; transferring the multimedia communication data to a switching device; establishing a connection between a browser embedded within the thin client device and a server, wherein the thin client device is configured to access Web Real-Time Communication (Web RTC) applications within a Web RTC device through the browser after establishing the connection between the browser and the server; establishing a connection between the Web RTC device and the switching device through a call control signal; and delivering and terminating the multimedia communication data to the thin client device using the browser embedded within the thin client device based on the call control signal.

According to yet another aspect of the present disclosure, wherein when executed, the instructions may further cause the processor to perform the following: delivering and terminating the multimedia communication data directly to an audio card of the thin client device through the browser embedded within the thin client device.

According to another aspect of the present disclosure, wherein when executed, the instructions may further cause the processor to perform the following: running a first session of accessing the multimedia communication data from the server from a first browser window of the browser embedded within the thin client device after establishing the connection between the browser and the server.

According to a further aspect of the present disclosure, wherein when executed, the instructions may further cause the processor to perform the following establishing a connection between the thin client device and the server via a second browser window embedded within a virtual desktop environment, the second browser window is separate from the first browser window in that the second browser window is not embedded within the browser of the thin client device; and running a second session of controlling the multimedia communication data from the second browser window.

According to yet another aspect of the present disclosure, wherein when executed, the instructions may further cause the processor to simultaneously run the first session and the second session.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
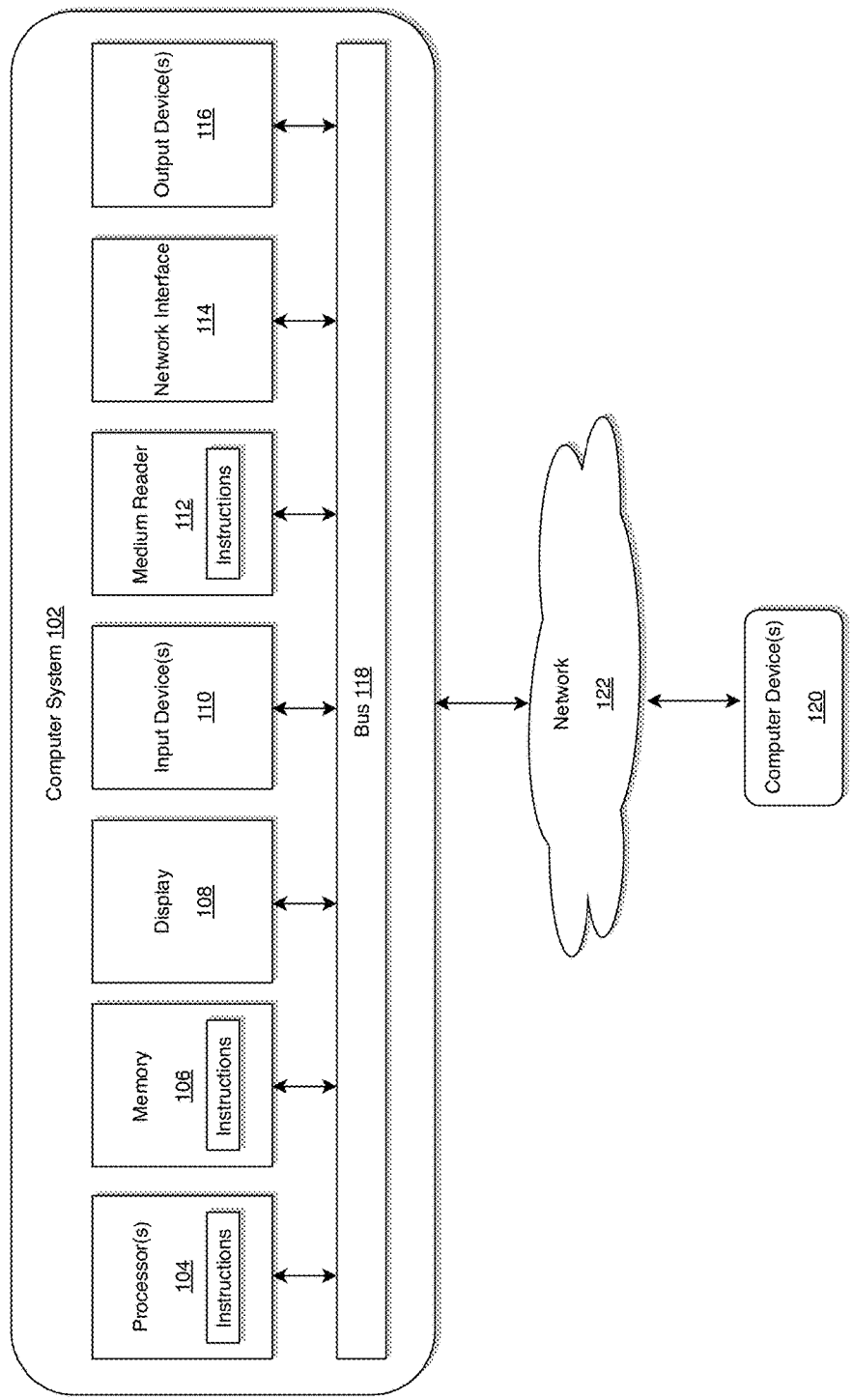
FIG. 1 illustrates a computer system for implementing a thin client device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a thin client device having a thin client module for efficient delivery and termination of multimedia communication traffic (or communication data) on a browser running on the thin client device without the need for specially installed software. In addition, the various aspects, embodiments, features, and/or sub-components provide optimized processes of implementing a thin client module in which the delivery and termination of multimedia communication traffic may be accomplished by utilizing existing ubiquitous browser software already installed or readily installed on the thin client, thereby eliminating the need for specialized software to be installed at the thin client.

Figure 2:
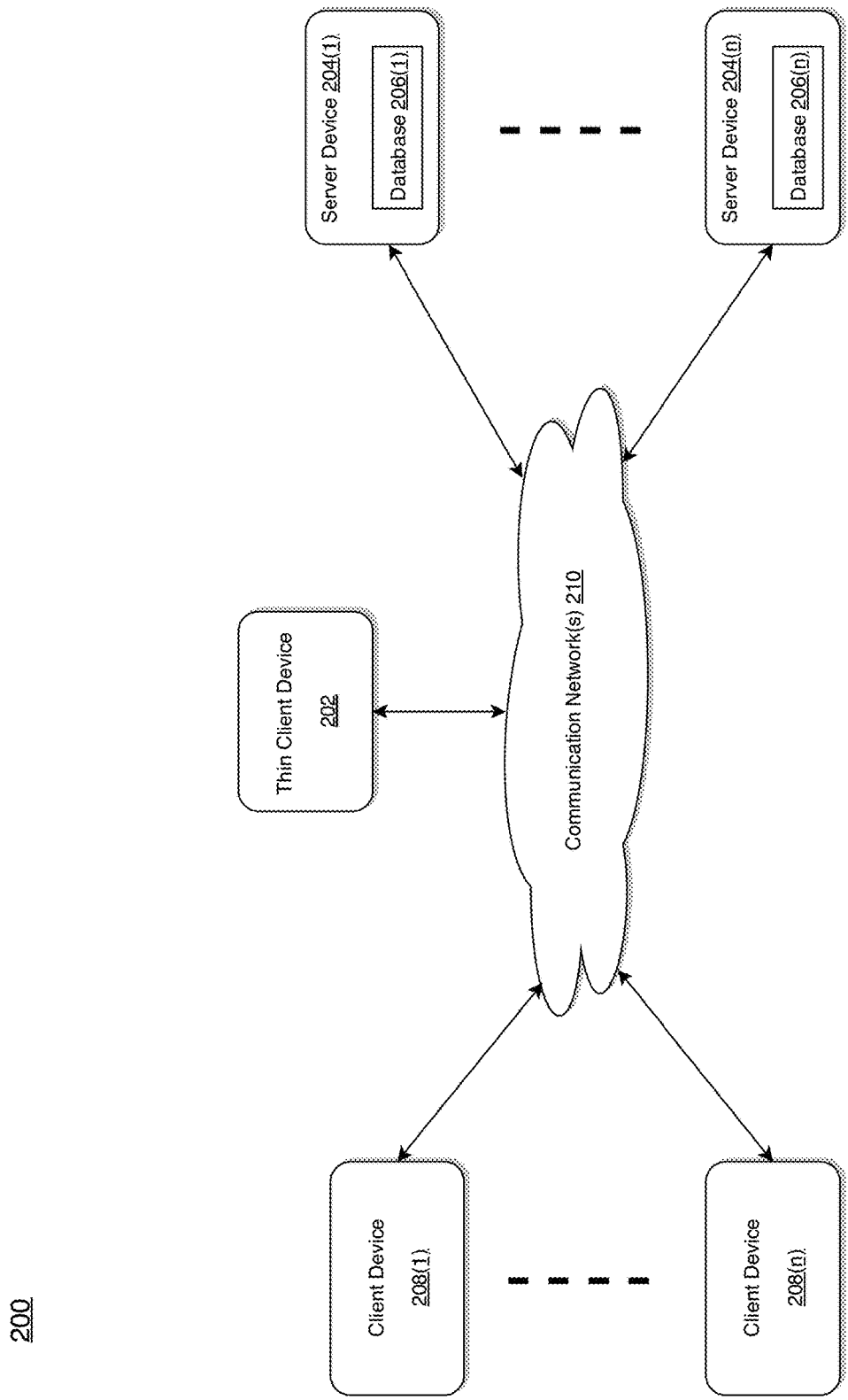
FIG. 2 illustrates an exemplary diagram of a network environment with a thin client device in accordance with an exemplary embodiment.

Referring to FIG. 2, a schematic of an exemplary network environment 200 for implementing a thin client device having a thin client module (TCM) of the instant disclosure is illustrated.

Conventional system, that does not implement a TCM of the instant disclosure, may not be able to process and deliver multimedia communication data to a thin client in an efficient and speedy manner. For example, conventionally, deployment of soft phone elements in virtual desktop environments may require specialized, vendor-specific software to be installed directly on the thin client. This may complicate the deployment of soft phone architecture and may often negate the cost saving effects of using soft phones rather than traditional desk phones. Furthermore, while delivery of multimedia communications data to a thin client utilizing a virtual desktop environment has been accomplished with specialized software, multimedia communication data that may be delivered to the thin client, but will continue to run on the data server, wasting computing resources.

According to exemplary embodiments, the above-described problems associated with conventional approach of delivering multimedia communication data to a thin client may be overcome by implementing a thin client device 202 that includes a TCM as illustrated in FIG. 2. The thin client device 202 may be the same or similar to the computer system 102 as described with respect to FIG. 1. However, according to exemplary embodiments, the thin client device 202 may include limited computing resources. The thin client device 202 referred to may be considered to be a two-way interactive communication device such as a mobile computing device, cellular phone, landline phone or an Internet appliance controller.

According to exemplary embodiments, the thin client devices as disclosed herein may be generally designed to have a relatively smaller in size, lighter in weight, lower in power consumption and as economically and portably as possible compared to typical desktop or portable computer. Such thin client designs may often result in very limited computing resources, for example, the computing power of the thin client devices disclosed herein may be equivalent to less than one percent of what is provided in a typical desktop or portable computer, and the memory capacity thereof may be generally less than 250 kilobytes, but the disclosure is not limited thereto.

The thin client device 202 may store one or more applications that can include executable instructions that, when executed by the thin client device 202, cause the thin client device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the thin client device 202 itself, may be located in virtual server(s) running in a cloud-based computing environment rather than being tied to one or more specific physical network computing devices. Also, the application(s) may be running in one or more virtual machines (VMs) executing on the thin client device 202. Additionally, in one or more embodiments of this technology, virtual machine(s) running on the thin client device 202 may be managed or supervised by a hypervisor.

In the network environment 200 of FIG. 2, the thin client device 202 is coupled to a plurality of server devices 204(1)-204(n) that hosts a plurality of databases 206(l)-206(n), and also to a plurality of client devices 208(1)-208(n) via communication network(s) 210. A communication interface of the thin client device 202, such as the network interface 114 of the computer system 102 of FIG. 1, operatively couples and communicates between the thin client device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the thin client device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and thin client devices that efficiently deliver and terminate multimedia communication traffic (or communication data) on a browser running on thin client device without the need for specially installed software within the thin client device.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The thin client device 202 may be a standalone device or integrated with one or more other devices or apparatuses, such as one or more of the server devices 204(1)-204(n), for example. In one particular example, the thin client device 202 may be hosted by one of the server devices 204(1)-204(n), and other arrangements are also possible. Moreover, one or more of the devices of the thin client device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the thin client device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the thin client device 202 that may efficiently deliver and terminate multimedia communication data at the thin client device by using a browser embedded within the thin client device. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the thin client device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the thin client device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the thin client device 202, the server devices 204(1)-204(n), or the client devices 208(1)-208(n), for example, may be configured to operate as virtual instances on the same physical machine. For example, one or more of the thin client device 202, the server devices 204(1)-204(n), or the client devices 208(1)-208(n) may operate on the same physical device rather than as separate devices communicating through communication network(s) 210. Additionally, there may be more or fewer thin client devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
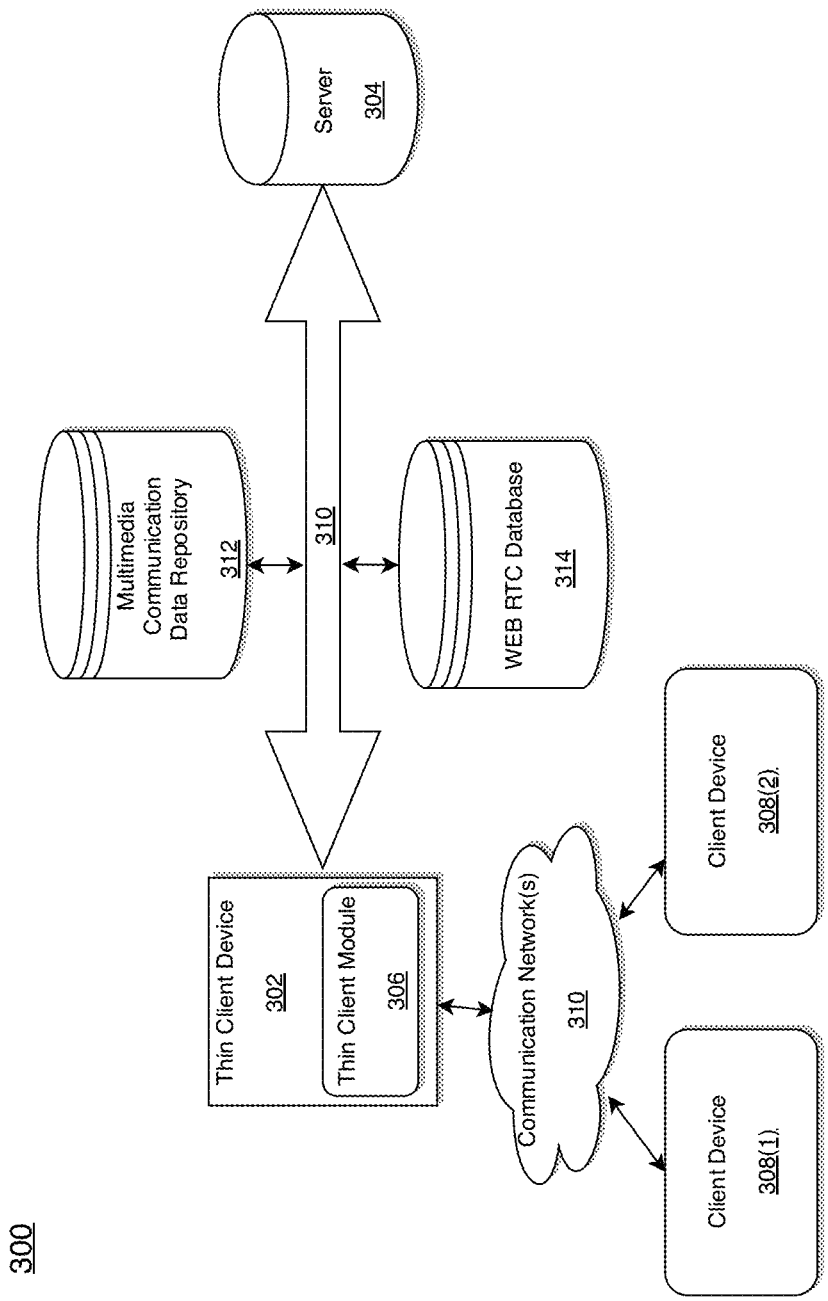
FIG. 3 illustrates a system diagram for implementing a thin client device with a thin client module in accordance with an exemplary embodiment.

According to exemplary embodiment, a thin client device 302 is described and shown in FIG. 3 as including a thin client module (TCM) 306, although it may include other rules, policies, modules, databases, or applications, for example. As will be described below, the TCM 306 is configured to automatically access multimedia communication data stored on a server 304 in an efficient manner by utilizing a browser embedded within the thin client device 302.

An exemplary process 300 for automatically accessing multimedia communication data stored on a server 304 in an efficient manner by utilizing a browser embedded within the thin client device 302, and by utilizing the network environment of FIG. 2 is shown as being executed in FIG. 3. Specifically, a first client device 308(1) and a second client device 308(2) are illustrated as being in communication with the thin client device 302. In this regard, the first client device 308(1) and the second client device 308(2) may be "clients" of the thin client device 302 and are described herein as such. Nevertheless, it is to be known and understood that the first client device 308(1) and/or the second client device 308(2) need not necessarily be "clients" of the thin client device 302, or any entity described in association therewith herein. Any additional or alternative relationship may exist between either or both of the first client device 308(1) and the second client device 308(2) and the thin client device 302, or no relationship may exist.

Further, the thin client device 302 is illustrated as being able to access multimedia communication data repository 312 and a Web Real-Time Communication (WEB RTC) database 314. WEB RTC may be an open project that allows web real-time communications via application processing interfaces (APIs). According to exemplary embodiments, the APIs may include Java Script APIs, but the disclosure is not limited thereto. The TCM module 306 of the thin client device 302 may be configured to access these databases for implementing a process for automatically accessing multimedia communication data from the server 304 by utilizing a browser embedded within the thin client module 306 via communication network(s) 310. Thus, according to exemplary embodiments, the thin client device 302 does not need to install any specialized software. The thin client device 302, according to exemplary embodiments, is configured to leverage the WEB RTC and web technologies to terminate the multimedia traffic (i.e., multimedia communication data) directly on the thin client device 302 using the existing WEB RTC-embedded browser already running on the thin client device 302, thereby improving the network communication between the thin client device 302 and the server 304 to access multimedia communication data.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein.

The process may be executed via the communication network(s) 310, which may comprise plural networks as described above. For example, in an exemplary embodiment, either or both of the first client device 308(1) and the second client device 308(2) may communicate with the thin client device 302 via broadband or cellular communication. Of course, these embodiments are merely exemplary and are not limiting or exhaustive.

Figure 4:
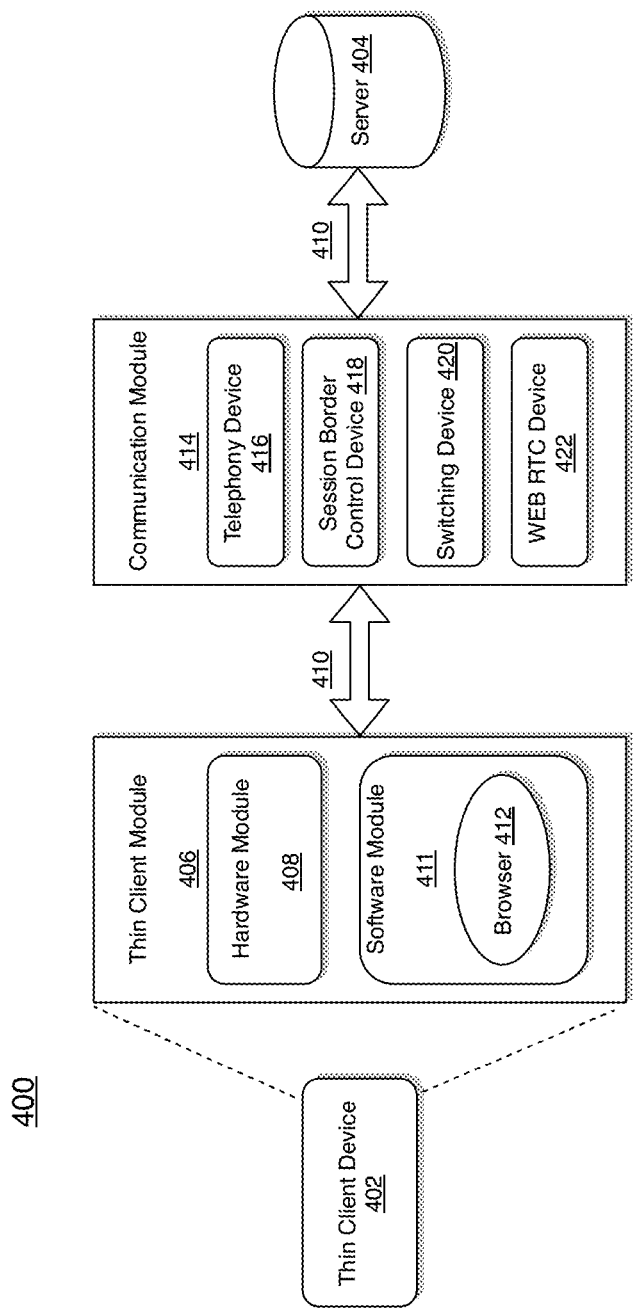
FIG. 4 illustrates a system diagram for implementing a thin client device with a thin client module and a communication module in accordance with an exemplary embodiment.

FIG. 4 illustrates a system diagram for implementing a thin client device with a thin client module and a communication module in accordance with an exemplary embodiment.

As illustrated in FIG. 4, the system diagram 400 may include a thin client device 402, a communication module 414 and a server 404. The thin client device 402 may include a thin client module 406 which may include a hardware module 408 and a software module 411. The hardware module 408 may include at least a sound card, a processor, and a memory. The software module 411 may include at least an operating system and a browser 412 embedded therein. Such operating system may be specially configured to be implemented for thin client applications, but, as would be recognized by one of ordinary skill, any type of operating system may be employed as long as a user is capable of implementing the browser 412 for interacting with networked resources. The browser 412 embedded with the thin client device 402 may be any browser configured to connect to the Internet and capable of WEB RTC functionalities, such as Internet Explorer, Google Chrome, Firefox, etc., as one of ordinary skill in the art would appreciate. One of ordinary skill in the art would further appreciate that the browser 412 may be a ubiquitous feature of thin client configurations, as thin client solutions require access to networked resources and applications illustrated in FIG. 4 for full functionality.

The communication module 414 may include a telephony device 416, a session border control (SBC) device 418, a switching device 420 and a WEB RTC device 422. The thin client device 402 including the thin client module 406, the communication module 414 and the server 404 may be interconnected via one or more communication networks 410. The communication network 410 may be the communication network 210 as illustrated in FIG. 2.

The system diagram 400 as illustrated in FIG. 4 may show a data pathway for the delivery and termination of multimedia communication data on the thin client device 402. According to exemplary embodiments, in a situation where the origin multimedia communication data is a Voice over Internet Protocol (VoIP) call, the call data (i.e., multimedia communication data) may be transmitted from the telephony device 416 to the SBC device 418 over the communication network 410. After receiving the call data, the SBC device 418 may transfer the multimedia communication data to the switching device 420. The SBC device 418 may be a device in VoIP networks that assists in the signaling and set-up and tear down of multimedia communication data. The SBC device 418 may be a border between the network 410 and enterprise networks connecting local company resources. The switching device 420 may be a system that serves as a private organization and may perform connection of central office lines or trunks and may provide intercommunication between a large numbers of telephone stations in the organization. From the switching device 420, the call data (i.e., the multimedia communication data) may be accessed by the TCM 406 via the browser 412.

According to exemplary embodiments, the TCM 406 is configured to establish a connection between the browser 412 embedded within the thin client 402 and the server 404. The TCM 406 may be configured to access Web RTC applications within the WEB RTC device 422 through the browser 412 after establishing the connection between the browser 412 and the server 404.

According to exemplary embodiments, a connection between the WEB RTC device 422 and the switching device 420 may be established through a session initiation protocol (SIP) call control signal, but the disclosure is not limited thereto. For example, the call control signal may include any other voice over internet protocol (VoIP) call control signal, including but not limited to a Web RTC protocol call control signal, an H.323 protocol call control signal, etc.

After establishing the connection between the WEB RTC device 422 and the switching device 420, the multimedia communication data may be stored onto the server 404 to be accessed by the browser 412 embedded within the thin client device 402, but the disclosure is not limited thereto. For example, that multimedia communication data is not limited to be stored onto the server 404 and the browser 412 embedded within the thin client device 402 is not limited to access the multimedia communication data stored onto the server 404. According to exemplary embodiments, the browser 412 embedded within the thin client device 402 may be connected to other distant end recipient or subscriber such as another communication device or communication software client to access multimedia communication data.

According to exemplary embodiments, the TCM 406 is configured for delivering and terminating the multimedia communication data at the thin client using the browser 411 embedded within the thin client device 402 based on the SIP control signal such that the multimedia communication data is no longer running on the server 404. Thus, the various aspects, embodiments, features, and/or sub-components according to the exemplary embodiments provide optimized processes of implementing the TCM 406 in which the delivery and termination of multimedia communication traffic (communication data) may be accomplished by utilizing existing ubiquitous browser software already installed or readily installed on the thin client device 402, thereby eliminating the need for specialized software to be installed at the thin client device 402, thereby significantly improving communication speed between the browser 412 and the server 404.

According to exemplary embodiments, the TCM 406 may be configured to further deliver and terminate the multimedia communication data from the server 404 directly to an audio card or sound card embedded on the hardware module 408 of the TCM 406 through the browser 412 embedded within the thin client device 402.

According to exemplary embodiments, WEB RTC technology may allow multimedia communication applications to work inside browsers without the need for additional plugins or installation of locally executable applications.

Figure 5:
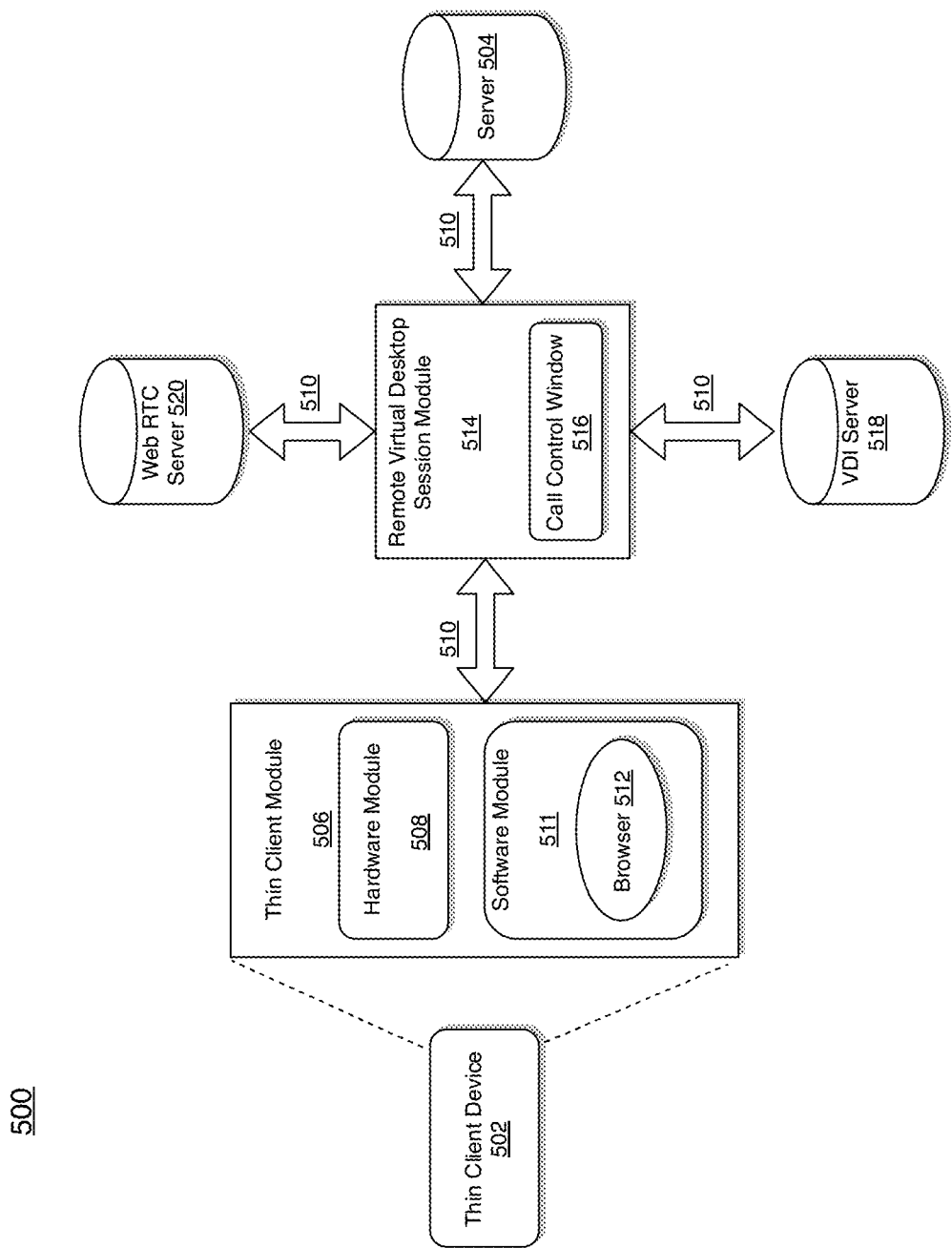
FIG. 5 illustrates a system diagram for implementing a thin client device with a thin client module and a remote virtual desktop session module in accordance with an exemplary embodiment.

FIG. 5 illustrates a system diagram for implementing a thin client device with a thin client module and a remote virtual desktop session module in accordance with an exemplary embodiment.

As illustrated in FIG. 5, the system diagram 500 may include a thin client device 502 including a thin client module (TCM) 506. The system diagram 500 may also include a remote virtual desktop session module (RVDSM) 514 including a call control window 516. The TCM may include at least a hardware module 508 and a software module 511. The hardware module 508 may include at least a sound card, a processor, and a memory. The software module 511 may include at least an operating system and a browser 512 embedded therein. Such operating system may be specially configured to be implemented for thin client applications, but, as would be recognized by one of ordinary skill, any type of operating system may be employed as long as a user is capable of implementing the browser 512 for interacting with networked resources. The browser 512 embedded with the thin client device 502 may be any browser configured to connect to the Internet and capable of WEB RTC functionalities, such as Internet Explorer, Google Chrome, Firefox, etc., as one of ordinary skill in the art would appreciate. One of ordinary skill in the art would further appreciate that the browser 512 may be a ubiquitous feature of thin client configurations, as thin client solutions require access to networked resources and applications illustrated in FIG. 5 for full functionality.

According to exemplary embodiments, the system diagram 500 may also include a Web RTC server 520 and a Virtual Desktop Infrastructure (VDI) server 518. The thin client device 502 including the TCM 506, the server 504, the RVDSM 514, the VDI server 518, and the Web RTC server 520 may be interconnected via one or more communication network(s) 510. The communication network(s) 510 may be the communication network(s) 210 as illustrated in FIG. 2.

According to exemplary embodiments, the TCM 506 may be configured to run/implement a first session of accessing the multimedia communication data from the server 504 by utilizing a first browser window of the browser 512 embedded within the TCM 506 of the thin client device 502 after establishing a connection between the browser 512 and the server 504 via the communication network(s) 510. According to exemplary embodiments, the TCM 506 may further be configured to run/implement a second session of controlling the multimedia communication data from a second browser window, e.g., a call control window 516, embedded within a virtual desktop environment of the RVDSM 514 after establishing a connection between the TCM 506 of the thin client device 502 and the server 504 via the second browser window embedded within a virtual desktop environment of the RVDSM 514. According to exemplary embodiments, the second browser window, e.g., the call control window 516 is separate from the first browser window of the browser 512 in that the second browser window is not embedded within the browser 512 of the TCM 506 of the thin client device 502. Rather, the second browser window is embedded within a virtual desktop environment of the RVDSM. According to exemplary embodiments, the TCM 506 may be configured to run/implement the first session and the second session simultaneously.

Referring to FIG. 5 again, the system diagram 500 illustrates an exemplary thin client configuration wherein the multimedia communication data may be controlled from a separate browser window (e.g., call control window 516) running within a virtual desktop environment. In this exemplary configuration, multimedia communication data may be accessed from the RVDSM 514 instituted via the VDI server 518. It may be appreciated that the call control window 516 may be a separate browser window or any similar application window associated with the RVDSM 514. According to exemplary embodiments, the call control window 516 may be configured to connect to the thin client device 502 through the server 504. Once a connection is established between the call control window 516 and the thin client device 502, the multimedia communication data may be delivered and terminated at the call control window 516 through the browser 512 in communication with the Web RTC server 520.

While the above examples in FIGS. 3-5 are illustrated as multimedia communication data originating from a telephony device outside the local network, it should be appreciated that the same concepts apply to multimedia communication data originating at the thin client device.

Figure 6:
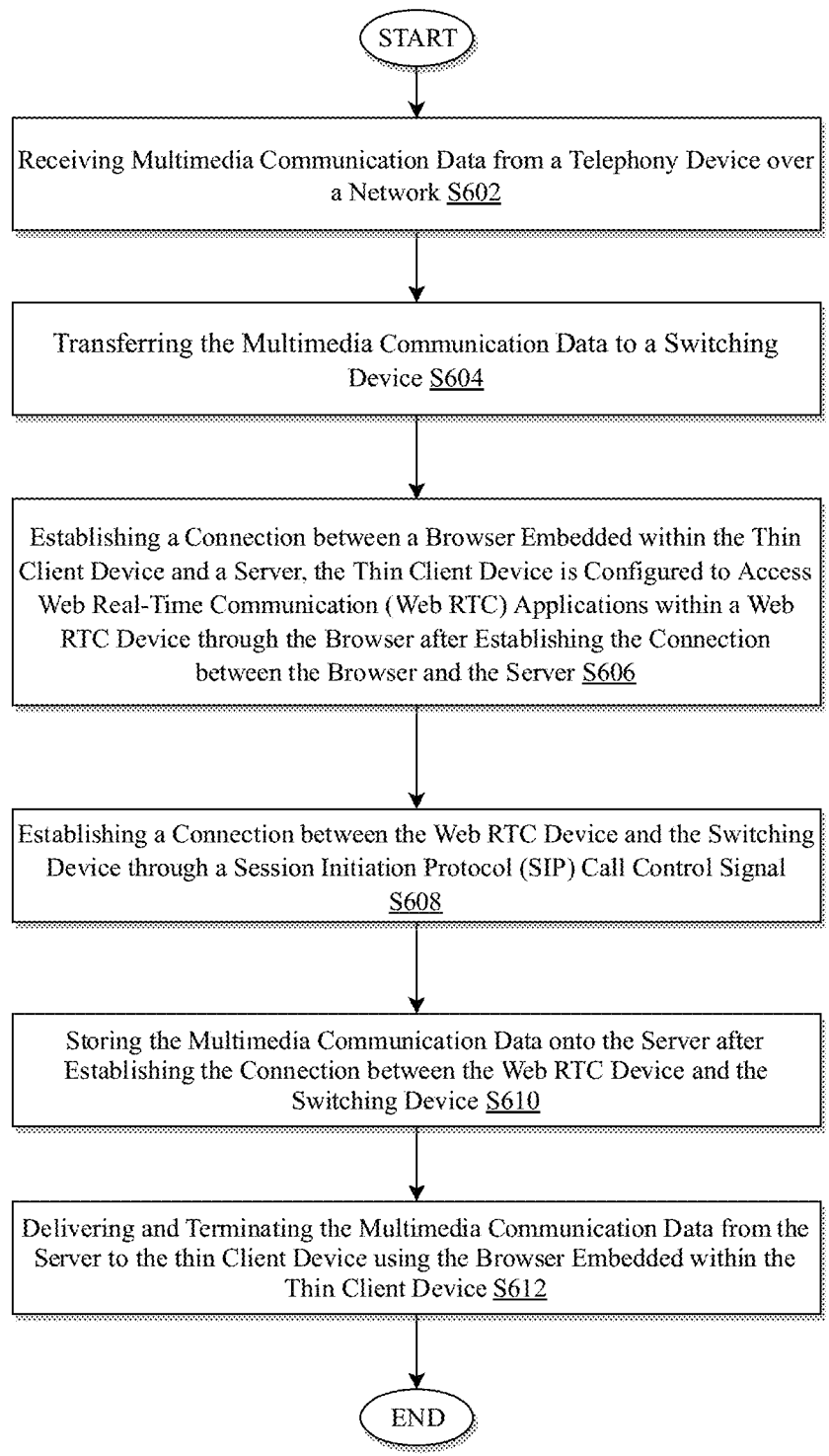
FIG. 6 illustrates a flow chart for implementing a thin client device in accordance with an exemplary embodiment.

FIG. 6 illustrates a flow chart for implementing a thin client device in accordance with an exemplary embodiment.

In the process 600 of FIG. 6, at step S602, multimedia communication data may be received by a Session Border Control (SBC) device from a telephony device over a network. According to exemplary embodiments, the SBC device may be the same as or similar to the SBC device 418, the telephony device may be the same or similar to the telephony device 416, and the network may be the same or similar to the communication network 410 as illustrated herein with respect to FIG. 4, but the disclosure is not limited thereto.

At step S604, the multimedia communication data may be transferred from the SBC device to the switching device.

At step S606, a connection may be established between a browser embedded within a thin client device and the server. According to exemplary embodiments, the thin client device may be the same or similar to the thin client devices illustrated herein with reference to FIGS. 2-5, but the disclosure is not limited thereto. The thin client device may be configured to access Web Real-Time Communication (Web RTC) applications within a Web RTC device through the browser after establishing the connection between the browser and the server. According to exemplary embodiments, the Web RTC device may be the same or similar to the WEB RTC device 422 as illustrated with reference to FIG. 4, but the disclosure is not limited thereto.

At step S608, a connection may be established between the Web RTC device and the switching device through a session initiation protocol (SIP) call control signal.

At step S610, the multimedia communication data may be stored onto the server after establishing a connection between the Web RTC device and the switching device through the session initiation protocol (SIP) call control signal to be accessed by the thin client device.

At step S612, the multimedia communication data may be delivered and terminated at the thin client device using the browser embedded within the thin client device based on the SIP control signal such that the multimedia communication data is no longer running on the server.

According to exemplary embodiments, the process 600 may be configured to deliver and terminate the multimedia communication data from the server directly to an audio card or sound card of the thin client device through the browser embedded within the thin client device. According to exemplary embodiments, the multimedia communication data is a voice over internet protocol (VoIP) call and the browser embedded within the thin client device may be a ubiquitous feature of a thin client configuration as the thin client device requires access to networked applications and resources to achieve full functionality.

According to exemplary embodiments, the process 600 may be further configured to run a first session of accessing the multimedia communication data from the server from a first browser window of the browser embedded within the thin client device after establishing the connection between the browser and the server.

According to exemplary embodiments, the process 600 may be further configured to establish a connection between the thin client device and the server via a second browser window embedded within a virtual desktop environment and run a second session of controlling the multimedia communication data from the second browser window. According to exemplary embodiments, the second browser window may be separate from the first browser window in that the second browser window is not embedded within the browser of the thin client. According to exemplary embodiments, the process 600 may be further configured to simultaneously run/implement the first session and the second session.

According to exemplary embodiments as disclosed above in FIGS. 1-6, technical improvements effected by the instant disclosure may include implementing a thin client module in which the delivery and termination of multimedia communication traffic may be accomplished by utilizing existing ubiquitous browser software already installed or readily installed on the thin client, thereby eliminating the need for specialized software to be installed at the thin client. Thus, the present disclosure, through one or more of its various aspects, embodiments, and/or specific features or sub-components, provides, inter alia, various systems, servers, devices, methods, media, programs, and platforms for implementing a thin client module for efficient delivery and termination of multimedia communication traffic (or communication data) on a browser running on thin client hardware without the need for specially installed software, thereby significantly improving communication speed between a thin client device and a server compared to conventional techniques.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for delivering a multimedia communication data to a thin client device by utilizing one or more processors and one or more memories, the method comprising:
    establishing a connection, by the one or more processors, between a browser embedded within the thin client device and a server, wherein the thin client device is configured to access Web Real-Time Communication (Web RTC) applications within a Web RTC device through the browser after establishing the connection between the browser and the server;
    establishing, by the one or more processors, a connection between the Web RTC device and a switching device through a call control signal, wherein the switching device receives multimedia communication data from a communication device; and
    delivering and terminating, by the one or more processors, the multimedia communication data directly to the thin client device using the browser embedded and running within the thin client device based on the control signal such that the multimedia communication data is no longer running on the server.

2. The method according to claim 1, further comprising: delivering and terminating, by the one or more processors, the multimedia communication data directly to an audio card of the thin client device through the browser embedded within the thin client device.

3. The method according to claim 1, wherein the multimedia communication data is a voice over internet protocol (VoIP) call.

4. The method according to claim 1, wherein the browser embedded within the thin client device is a ubiquitous feature of a thin client device configuration.

5. The method according to claim 1, further comprising:
    running, by the one or more processors, a first session of accessing the multimedia communication data from the server from a first browser window of the browser embedded within the thin client device after establishing the connection between the browser and the server.

6. The method according to claim 5, further comprising:
    establishing a connection, by the one or more processors, between the thin client device and the server via a second browser window embedded within a virtual desktop environment, the second browser window is separate from the first browser window in that the second browser window is not embedded within the browser of the thin client device; and
    running, by the one or more processors, a second session of controlling the multimedia communication data from the second browser window.

7. The method according to claim 6, further comprising: simultaneously running, by the one or more processors, the first session and the second session.

8. A system for delivering a multimedia communication data to a thin client device, comprising:
    a processor; and a
    server having a memory,
    wherein the processor is configured to:
    establish a connection between a browser embedded within the thin client device and a server, wherein the thin client device is configured to access Web Real-Time Communication (Web RTC) applications within a Web RTC device through the browser after establishing the connection between the browser and the server;
    establish a connection between the Web RTC device and a switching device through a call control signal, wherein the switching device receives multimedia communication data from a communication device; and
    deliver and terminate the multimedia communication data directly to the thin client device using the browser embedded and running within the thin client device based on the control signal such that the multimedia communication data is no longer running on the server.

9. The system according to claim 8, wherein the processor is further configured to deliver and terminate the multimedia communication data directly to an audio card of the thin client device through the browser embedded within the thin client device.

10. The system according to claim 8, wherein the multimedia communication data is a voice over internet protocol (VoIP) call.

11. The system according to claim 8, wherein the browser embedded within the thin client device is a ubiquitous feature of a thin client device configuration.

12. The system according to claim 8, wherein the processor is further configured to run a first session of accessing the multimedia communication data from the server from a first browser window of the browser embedded within the thin client device after establishing the connection between the browser and the server.

13. The system according to claim 12, wherein the processor is further configured to:
    establish a connection between the thin client device and the server via a second browser window embedded within a virtual desktop environment, the second browser window is separate from the first browser window in that the second browser window is not embedded within the browser of the thin client device; and
    run a second session of controlling the multimedia communication data from the second browser window.

14. The system according to claim 13, wherein the processor is further configured to simultaneously run the first session and the second session.

15. A non-transitory computer readable medium configured to store instructions for delivering a multimedia communication to a thin client device, wherein when executed, the instructions cause a processor to perform the following:
    establishing a connection between a browser embedded within the thin client device and a server, wherein the thin client device is configured to access Web Real-Time Communication (Web RTC) applications within a Web RTC device through the browser after establishing the connection between the browser and the server;
    establishing a connection between the Web RTC device and the switching device through a call control signal, wherein the switching device receives multimedia communication data from a communication device; and delivering and terminating the multimedia communication data directly to the thin client device using the browser embedded and running within the thin client device based on the control signal such that the multimedia communication data is no longer running on the server.

16. The non-transitory computer readable medium according to claim 15, wherein when executed, the instructions further cause the processor to perform the following:
delivering and terminating the multimedia communication data directly to an audio card of the thin client device through the browser embedded within the thin client device.

17. The non-transitory computer readable medium according to claim 15, wherein the multimedia communication data is a voice over internet protocol (VoIP) call.

18. The non-transitory computer readable medium according to claim 15, wherein the browser embedded within the thin client device is a ubiquitous feature of a thin client device configuration.

19. The non-transitory computer readable medium according to claim 15, wherein when executed, the instructions further cause the processor to perform the following:
running a first session of accessing the multimedia communication data from the server from a first browser window of the browser embedded within the thin client device after establishing the connection between the browser and the server.

20. The non-transitory computer readable medium according to claim 19, wherein when executed, the instructions further cause the processor to perform the following:
establishing a connection between the thin client device and the server via a second browser window embedded within a virtual desktop environment, the second browser window is separate from the first browser window in that the second browser window is not embedded within the browser of the thin client device; and
running a second session of controlling the multimedia communication data from the second browser window.

* * * * *